(12) United States Patent
Hong

(10) Patent No.: US 6,421,698 B1
(45) Date of Patent: Jul. 16, 2002

(54) MULTIPURPOSE PROCESSOR FOR MOTION ESTIMATION, PIXEL PROCESSING, AND GENERAL PROCESSING

(75) Inventor: Suk Hyun Hong, San Jose, CA (US)

(73) Assignee: Teleman Multimedia, Inc., Alviso, CA (US)

( * ) Notice: Subject to any disclaimer, the term of this patent is extended or adjusted under 35 U.S.C. 154(b) by 0 days.

(21) Appl. No.: 09/186,725

(22) Filed: Nov. 4, 1998

(51) Int. Cl.[7] .............................................. G06F 7/38
(52) U.S. Cl. ...................................................... 708/490
(58) Field of Search ................................ 708/490, 201, 708/670; 375/240.15, 240.16, 240.24; 382/236; 348/415.1, 416.1, 699

(56) References Cited

U.S. PATENT DOCUMENTS

| | | | |
|---|---|---|---|
| 5,594,813 A | * 1/1997 | Fandrianto et al. | 348/416.1 |
| 5,696,836 A | * 12/1997 | Yoshino et al. | 348/699 |
| 5,870,618 A | * 2/1999 | Fujikawa et al. | 712/1 |
| 5,973,742 A | * 10/1999 | Gardyne et al. | 348/699 |
| 6,058,142 A | * 5/2000 | Ishikawa et al. | 348/699 |

* cited by examiner

Primary Examiner—Tan V. Mai
(74) Attorney, Agent, or Firm—David T. Millers

(57) ABSTRACT

A video processor has motion estimation, pixel processing, and general processing modes. In the processor, an internal memory acts as a buffer containing a search window in motion estimation mode and as a scratch pad in pixel and general processing modes. Another internal memory acts as a buffer for a reference block in search mode and as a register file in pixel and general processing modes. Both internal memories provide parallel pixel-size data elements in pixel processing mode and larger data elements in general processing mode. An ALU in the processor has multiple slices that operate independently for parallel processing in motion estimation and pixel processing modes and cooperatively to provide a larger data width for general purpose processing mode. The ALU includes a line buffer, and each ALU slice includes two adders with operand selection circuitry that enables on-the-fly compression and half-pixel interpolation processes, single cycle determination of absolute differences, and arithmetic operations.

7 Claims, 4 Drawing Sheets

MULTIPURPOSE PROCESSOR FOR MOTION ESTIMATION, PIXEL PROCESSING, AND GENERAL PROCESSING

BACKGROUND

1. Field of the Invention

This invention relates to a processor architecture for video processing tasks such as motion estimation and pixel processing where the processor also incorporates general processing capabilities and further relates to arithmetic logic units and multiply units for such processors.

2. Description of Related Art

General purpose processors commonly have an architecture that allows the processor to perform a wide variety of memory access, arithmetic, logical, and program control operations. The wide variety of operations simplifies (or enables) development of software for a nearly endless variety of tasks. For example, with appropriate software, a general purpose processor can execute programs including operating systems, communication applications, word processing applications, data bases, spread sheets, and games. General purpose processors can also perform multimedia tasks such as video data processing (encoding, decoding, and filtering), audio data processing, and communications data processing. A drawback of general purpose processors is that the processor's architecture may not be efficient for some tasks. For example, video data processing often requires manipulation of large two-dimensional arrays of pixel values. General purpose processors typically handle one pixel value or a few pixel values per instruction and must repeatedly access external memory to retrieve appropriate pixel values just before processing the pixel values.

A processor designed for a specific task (commonly referred to as a digital signal processor or DSP) can be much more efficient at the task and therefore much less expensive than a general purpose processor that provides the same performance when performing the task. An example of a special purpose DSP is an MPEG video decoder that includes a logic specifically adapted for decoding an MPEG video data stream. While special purpose DSPs can be very efficient at specific tasks, such DSPs are typically incapable of or unsuited for other tasks. Accordingly, a system for multimedia data processing may require several separate DSPs for the different tasks and may still need a general purpose processor for control functions not implemented on any of the DSPs.

A processor architecture is desired that efficiently performs a variety of video and general processing tasks. Such a processor would ideally provide high performance at minimal expense and would eliminate the need for additional DSPs or a general purpose processor in many multimedia data processing systems.

SUMMARY

In accordance with the invention, a video signal processor operates in three modes, a motion estimation mode for searching a search window to find a block that best matches a reference block, a pixel processing mode for processing such as a half-pixel interpolation and vertical and horizontal filtering of pixel data, and a general processing mode for a general purpose processing including system control and multimedia calculations such as DCTs and FFTs. The processor, by itself, can support the diverse control, video, audio, and modem functions. In one embodiment, the processor includes first and second on-chip memories that have different functions depending on the operating mode. In general processing mode, the first memory is a fast scratch memory and the second memory is a register file containing operands for a relatively wide (e.g., 32-bit) data paths. In pixel processing mode, the first memory still operates as a scratch pad, but the second memory is a register file containing vector operands with pixel-value-size (e.g., 8-bit) data elements. In search mode, the first memory is a search window buffer, the second memory stores a reference block of pixel values, and both memories directly provide operands to the processor's data paths.

The processor's data paths may include an arithmetic logic unit and a multiply unit, each of which includes multiple slices. The multiple slices operate independently in for parallel processing in motion estimation and pixel processing modes and operate cooperatively to provide a larger data path width for general purpose processing. In particular, the multiply unit uses four multipliers to independently perform for four parallel multiplications of pixel values or uses the four multipliers cooperatively with an adder to perform a multiplication of larger operands. Each ALU slice includes a pair of adders and operand selection circuits. A line buffer for the ALU enables on-the-fly video data compression and half-pixel interpolation processes on input data, single cycle determination of absolute differences between pixel values, and general arithmetic operations such as addition and subtraction.

In accordance with one embodiment of the invention, an integrated processor includes: a processing circuit; a first memory; and a second memory. The processor operates in a first mode in which the first memory stores pixel values of a search window and the second memory stores pixel values of a reference block for which a matching block in the search window is sought. In this mode both memories can directly provide operands to the processing circuit. The processor operates in a second mode in which the second memory operates as a register file having storage locations identified by register numbers in instructions. In the second mode, the first memory operates as a scratch pad, and the processor has read and write paths for transferring data between the memories in parallel with execution of other instructions. One embodiment of the processing circuit includes an arithmetic logic unit and a multiply unit, each of which includes a plurality of slices that operate independently in the first mode to perform multiple parallel operations on pixel values and operate cooperatively in the second mode to operate on operands that are larger than the pixel values.

In accordance with a further aspect of the invention, a processor includes: an input port for input of pixel data; an operand selection circuit operable to direct pixel data from the input port to the arithmetic logic unit. Results from the arithmetic logic unit can be written into the first or second memory. In addition, the arithmetic logic unit can perform an on-the-fly compression of pixel data from the input port while writing compressed data to either the first or second memory. In one specific implementation, the on-the-fly compression averages pixels horizontally, vertically, or both horizontally and vertically. The compression permits a hierarchical motion vector search that first uses compressed pixel data and then uses uncompressed pixel data. In particular, a first step of the hierarchical motion vector search searches a compressed search window for a block most similar to a compressed reference block. A second step searches an uncompressed search window that is centered on the area identified in the first step. The hierarchical search permits searches of large search windows using a relatively small search window buffer and reduces processing time by reducing the total number of pixel value comparisons.

One embodiment of the arithmetic logic unit includes: a line buffer; and a plurality of slices, where each slice includes a first adder and a second adder. Each adder can perform an addition or a subtraction. In each slice, a first multiplexing circuit for the first adder has input signals including signals representing an associated portion of a first operand, an associated portion of a second operand, and consecutive portions of one of the first and second operands. A second multiplexing circuit for the second adder has input signals including signals representing the associated portion of the first operand, the associated portion of the second operand, data from the line buffer, and results from the first adder. The portions of the operands are typically the size of a pixel value.

For one data compression process, the first multiplexing circuit selects consecutive pixel values as operands for the first adder. For even lines in an image array, the line buffer stores the results from the first adder. For odd lines of the image array, the second multiplexing circuit selects the result from the first adder and a previous result from the line buffer as the operands for the second adder. The resulting sum from the second adder can be shifted to provide an average of four neighboring pixel values in two lines of the image array. For some half-pixel interpolation processes, the first adder stores results to the line buffer and simultaneously provides a sum to the second adder for both even and odd lines. With proper selection of input operands, the ALU can perform a half-pixel interpolation to determine horizontal averaged pixel values, vertically averaged pixel values, or pixel values that are averaged both horizontally and vertically. This permit use of half-pixel motion vectors.

For determining an absolute difference between two blocks of pixel values, the first operand contains pixel values from a first block, and the second operand contains pixel values from a second block. The first adder determines the difference between a pixel value from the first operand and a pixel value from the second operand, and the second adder determines the difference between the pixel value from the second operand and the pixel value from the first operand. A multiplexer coupled to the adders selects whichever difference is positive. A tree adder in the processor can add the positive results from the different slices together to generate a sum of the absolute differences between pixel values in blocks.

In motion search mode, an addressing system implemented in the processor for the search window buffer and the register file provides adjustable incrementing and address basing that simplifies selection of pixel values corresponding to a particular block in the search window. This simplifies coding of programs for video processing such as performing a search or a determination of the difference between the reference block and a block within the search window.

As another aspect of the invention, a multiply unit includes one or more sets of four multipliers and one or more adders that combine results from an associated set of multipliers. The multipliers in a set when operating independently generate four products, for example, four products of 8-bit values. When four multipliers operate cooperatively with the associated adder, the adder combines the results from four multipliers to generate a product of two double-size operands, for example, the product of two 16-bit operands. To perform the combination, the adder has input ports that are larger than output ports of the multipliers, and the output ports of the multipliers are coupled to bits within the input ports of the adder according to the significance of the product determine by the multiplier. An output circuit for the multiply unit provides output signals from the multipliers when the multiply unit operates in a first mode (e.g., pixel processing mode), and provides an output signal from the adder when the multiply unit operates in a second mode (e.g., general processing mode). The multiplication unit further includes an operand selection circuit that selects different portions of operands for each multiplier. The portions selected for a multiplier typically depends on the processor's operating mode.

BRIEF DESCRIPTION OF THE DRAWINGS

Use of the same reference symbols in different figures indicates similar or identical items.

DETAILED DESCRIPTION

In accordance with an aspect of the invention, a processor has an architecture that efficiently performs video data processing such as motion searches, horizontal filtering, vertical filtering, and half-pixel interpolation and performs general purpose processing for general control of video, audio, and modem data processing. The processor is operable in different modes for different types of processing. The architecture provides multiple data path slices for parallel processing of pixel values during video processing modes and cooperative processing for a wider data path during a general processing mode. In particular, separate slices in a multiply unit perform multiple parallel multiplications for pixel processing or motion estimation and cooperative operations for general purpose processing. A specialized arithmetic logic unit similarly provides parallel and cooperative operations. Memories in the processor such as a register file and a search window buffer have different functions in different processor modes.

In one embodiment, three operating modes of the processor include motion estimation mode, pixel processing mode, and general processing mode. Motion estimation mode is for searching for motion vectors during a video encoding process. Pixel processing mode is for parallel processing of pixel values, for example, for half-pixel interpolations, vertical and horizontal filtering, and general manipulation of pixel values arranged in two-dimensional arrays. General processing mode is for general purpose processing such as system control functions and permits a larger data width. Microcode with relative coding provides the processor with programming flexibility for a wide variety of functions so that a system containing the processor in accordance with the invention may not need additional DSPs or a separate general purpose processor.

Figure 1:
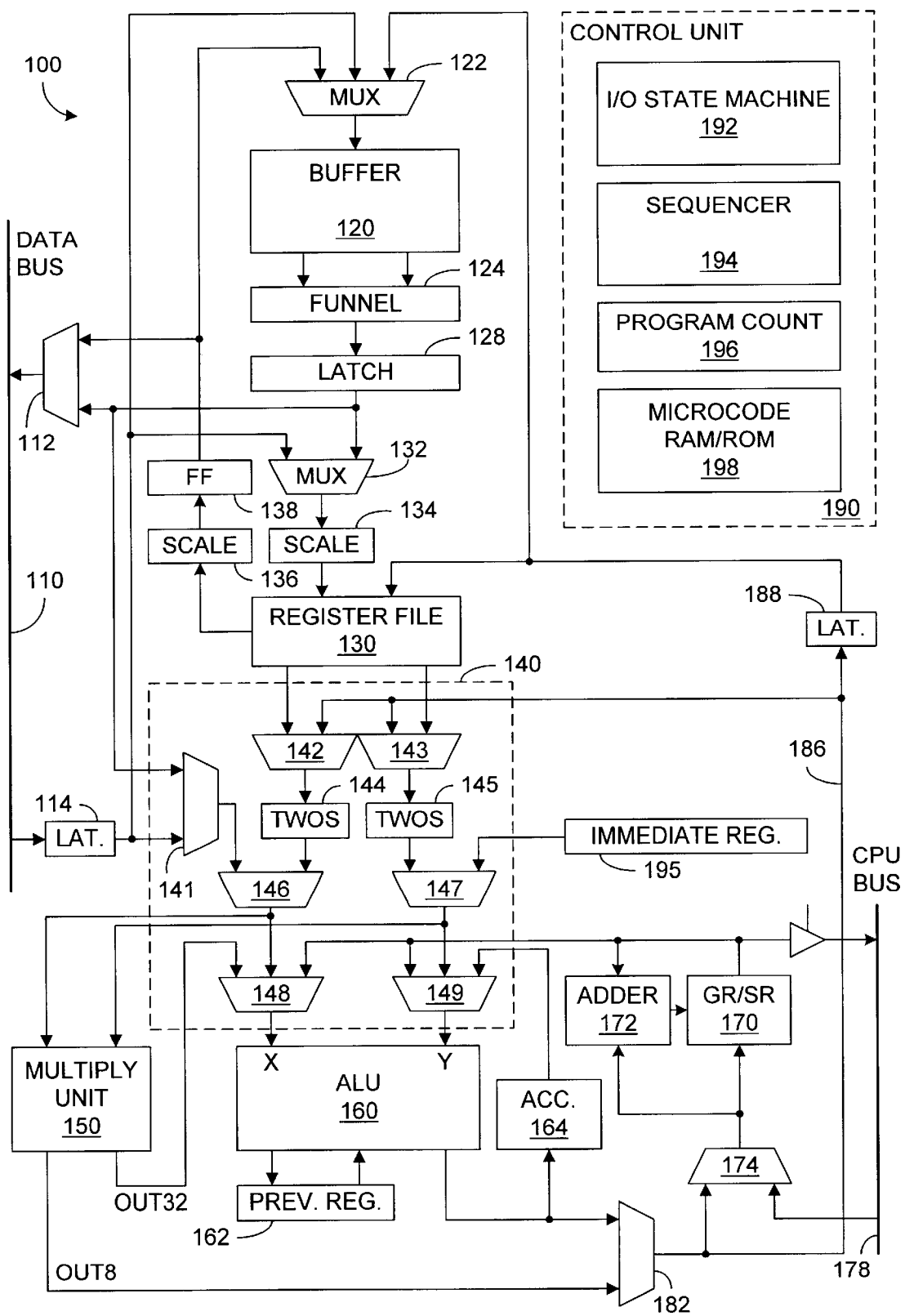
FIG. 1 is a block diagram of a processor in accordance with an embodiment of the invention.

FIG. 1 is a block diagram of a processor 100 in accordance with an embodiment of the invention. Processor 100 includes a buffer 120, a register file 130, a multiply unit 150, an arithmetic logic unit (ALU) 160, general and special registers 170, and a control unit 190. Buffer 120 is a 3-port random access memory having one write port and two read ports. In an exemplary embodiment of the invention, buffer 120 is 128×64-bit SRAM having a 64-bit write port and two 64-bit read ports. Alternatively, buffer 120 can be a larger memory such as a 256×64-bit SRAM. As described further below, buffer 120 stores pixel values of a search window in a motion estimation mode of processor 100, and the size of buffer 120 determines the maximum dimensions of the search window. During pixel processing and general purpose modes, buffer 120 provides a fast on-chip scratch pad memory having an addressing scheme that is convenient for manipulating blocks in two-dimensional image arrays.

A multiplexer 122 selects the data signal applied to the write port of buffer 120. The data written to buffer 120 can be from a bi-directional I/O data bus 110 for processor 100, a result bus 186 coupled to ALU 160, or register file 130. Processor 100 has wide data buses and ports for parallel transfers of multiple pixel values. In the exemplary embodiment, data bus 110, the input ports of multiplexer 122, and the write port of buffer 120 are 64 bits wide for parallel processing of eight 8-bit pixel values in motion estimation and pixel processing modes or parallel processing of two 32-bit values in general processing mode. Data bus 110 connects via I/O ports (not shown) of processor 100 to an external memory system (not shown). In a typical application, processor 100 resides on a multimedia card or device coupled to a local bus of a host computer, and data bus 110 is for DMA transfers to and from the host computer.

An input latch 114 coupled to data bus 110 temporarily stores data external sources provide via data bus 110. Latch 114 connects to the write port of buffer 120 via multiplexer 122 so that input data can be directly written to buffer 120. Alternatively, ALU 160 can compress input pixel data before writing to buffer 120. For data compression, processor 100 implements an on-the-fly pixel averaging during which ALU 160 averages two or more incoming pixel values to determine the average values written to buffer 120 or register file 130. In particular, for a two-to-one compression ALU 160 averages two horizontally or vertically adjacent pixel values from input video data on data bus 110 and feeds the resulting average via a latch 188 into memory 120 or 130. For a four-to-one compression ALU 160 averages four pixel values from a 2×2 block of input video data from data bus 110 and stores the resulting average in memory 120 or 130. Latch 188, which connects to multiplexer 122, stores results from ALU 160 or other processing circuit for writing into buffer 120 or register file 130. The four-to-one compression of video data is a first part of a hierarchical search described below. The hierarchical search reduces search time and reduces storage requirements for buffer 120 because pixel values in memories 120 and 130 can represent an area of video image that is four times larger than possible without compression.

Another source of data for buffer 120 is a flip-flop 138, which stores values from register file 130. Instructions that transfer data from register file 130 to buffer 120 allow use of buffer 120 as a fast scratch pad in general processing and pixel processing modes. Such data transfers between memories 130 and 120 are in parallel with execution of other instructions. A scale circuit 136 either passes data unchanged from register file 130 or changes the width of data values being transferred. For example, scale circuit 136 can truncate a 32-bit value calculated in general processing mode to eight bits for storage as a pixel value in buffer 120. Using scaling and packing of scaled values, four 64-bit values read from register file 130 can be packed into a single 64-bit value in flip-flop 138 before writing to buffer 120. Similarly, transfers from buffer 120 to register file 130 can leave unchanged or expand values from buffer 120.

A funnel 124 takes the data from both read ports of buffer 120 and selects a subset of that data for temporary storage in a latch 128. For example, in the exemplary embodiment, funnel 124 receives 128 bits, 64 bits from each of the two read ports of buffer 120, and outputs a 64-bit subset to latch 128. The selected output bits from funnel 124 can come from one or both the read ports of buffer 120, starting at any byte boundary. For example, if each read port provides eight 8-bit pixel values, funnel 124 selects 0 to 8 pixel values from the first read port and 8 to 0 pixel values from the second read port for a total of eight pixel values. Typically, in the motion estimation mode or pixel processing mode, the two read ports provide sixteen pixel values read from two consecutive 64-bit storage locations in buffer 120, and funnel 124 selects a set of eight consecutive pixel values from among the sixteen pixel values read. Funnel 124 effectively aligns a 64-bit output value from buffer 120, on any desired byte in buffer 120. Latch 128 connects to: data bus 110 through a multiplexer 112 for output on data bus 110; to operand selection circuit 140 for providing operands in search mode; and to register file 130 through a multiplexer 132 and a scale circuit 134.

Register file 130 is a 5-port memory having three read ports and two write ports. Two of the read ports provide operands for data path operations. One read port provides data for transfer to buffer 120. One of the two write ports is for storing results from data path operations, and the other write port is for data transferred from buffer 120. In the exemplary embodiment of the invention, register file 130 is a 32×64-bit SRAM. The function of register file 130 depends on the operating mode of processor 100. In a general purpose mode of processor 100, register file 130 stores intermediate data accessible by register number (0 to 31 in the exemplary embodiment). In the motion estimation mode of processor 100, register file 130 stores a reference image or reference block for which processor 100 attempts to find a best match in a search window. In pixel processing mode, each register in register file 130 stores up to eight pixel values for parallel processing.

The write port for writing the results from executed instructions receives a data value from latch 188. The write port for data transfers receives data from buffer 120 via funnel 124, latch 128, multiplexer 132 and scale circuit 134 or from data bus 110 via input data latch 114, multiplexer 132 and scale circuit 134. One read port of register file 130 provides data via scale circuit 136 to latch 138 for writing into buffer 120 via multiplexer 122. The other two read ports supply operands to multiply unit 150 and/or ALU 160 via operand selection circuit 140.

Operand selection circuit 140 selects operands and provides the selected operands to multiply unit 150 for execution of instructions requiring multiplications and to ALU 160 for execution of instructions requiring shifts and arithmetic operations. In motion estimation mode, each operand is a 64-bit quantity that contains eight pixel values that processor 100 processes in parallel. One 64-bit operand is from buffer 120 or data bus 110 via a multiplexer 141, and the other operand is from register file 130. In pixel processing mode, register file 130 supplies both a 64-bit bit operands, and each operand contains eight pixel values that processor 100 processes in parallel. In general processing mode, each operand contains up to two 32-bit values. Sources of operands for operand selection circuit 140 include data bus 110, buffer 120, register file 130, a results bus 186, and a register 195 that provides an immediate value from an instruction. Typical instructions for processor 100 include register numbers identifying storage locations in register file 130 for source and destination operands. However, some operations, particularly those used in search estimation mode, uses special registers 170 as described below to selected operands from either buffer 120 or register file 130. An instruction can be issued to multiply unit 150 or ALU 160 if the required source operands are valid in register file 130 or on result bus 186. In operand selection circuit 140, multiplexers 142 and 143 select register file 130 if no pending instruction affects a required source operand. Alternatively, multiplexers 142 and 143 select an operand from results bus 186 while results are being written to a source register.

Twos-complement units 144 and 145 contain latches which temporarily store source operands from result bus 186 or register file 130. In particular, these latches register a result on source bus 186 at the same time latch 188 registers the result so that the result can be a source operand while being written to register file 130. Twos-complement units 144 and 145 perform twos-complement operations on operands when an instruction requires. In general processing mode, twos-complement units 144 and 145 perform twos-complements on any negative 16-bit source operands for multiply operations and passes sign bits to multiply unit 150 and ALU 160 as described further below.

For multiply or ALU instructions, multiplexers 141, 146, and 147 select sources of operands such as data bus 110, buffer 120, or immediate value register 195. In general purpose mode, multiply or multiply-and-accumulate instructions require two clock cycles, one clock cycle in each of multiply unit 150 and ALU 160, and multiply unit 150 is another source of operands for ALU 160. Other sources of operands include an accumulator 164 and special registers 170, and multiplexers 148 and 149 make the final selection of source operands for ALU 160. As described below, multiply unit 150 provides a signal OUT32 to ALU 160 for completion of multiply and multiply-and-accumulate operations in general processing mode.

Multiply unit 150 contains multiple slices, each of which includes a multiplier. The separate multipliers can operate in parallel to perform multiple separate multiplications for pixel processing or cooperate in sets of four to perform one or more multiplications of larger multiplicands for general purpose processing. In the exemplary embodiment, operand selection circuit 140 provides two 64-bit operands A and B to multiply unit 150, which contains eight 9×9-bit signed multipliers. In search and pixel processing modes, operands A and B are contain 8-bit pixel values A0 to A7 and B0 to B7, and multiply unit 150 performs eight parallel multiplications A0*B0, . . . , A7*B7. The 9×9 multipliers support multiplication of 8-bit signed or unsigned values. Otherwise, 8×8-bit multipliers are sufficient. In general processing mode, each operand A and B contains two 32-bit values, and the eight multipliers in multiply unit 150 cooperate in two sets of four and act as two 16×16 unsigned multipliers.

Figure 2:
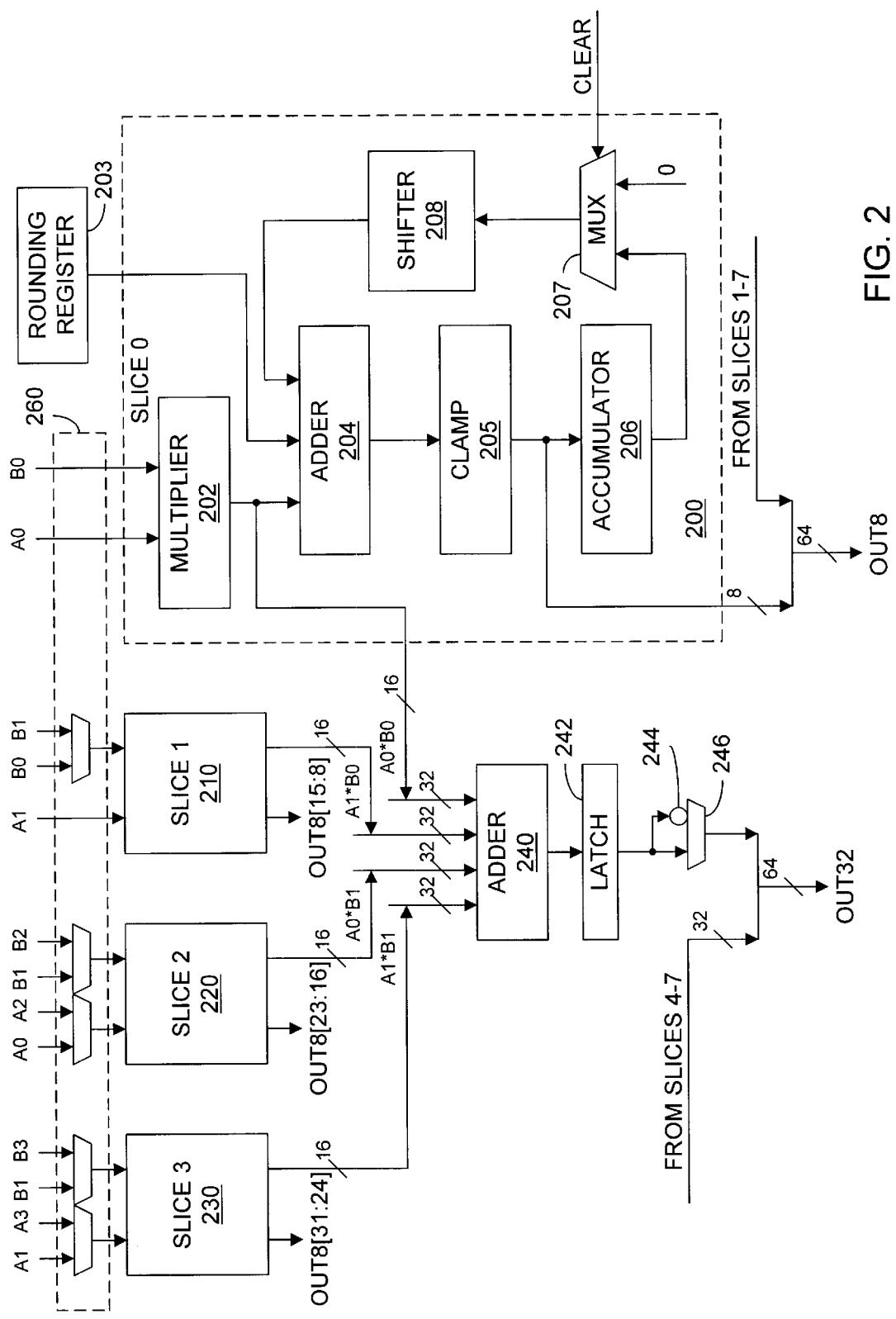
FIG. 2 is a block diagram of a portion of a multiply unit for the processor of FIG. 1.

FIG. 2 shows a portion of multiply unit 150 including four substantially identical slices 200, 210, 220, and 230. For ease of illustration internal functional units are only shown for slice 200, but slices 210, 220, and 230 contain similar structures. Multiply unit 150 further includes four more slices (not shown) that are similar or identical to slice 200. As illustrated, slice 200 contains a 9×9 multiplier 202, an adder 204, a clamp circuit 205, an accumulator 206, and a shifter 208. In slice 200, multiplier 202 performs a signed multiplication of two 9-bit integers derived from bytes A0 and B0. Bytes A0 and B0 are either pixel values or the least significant bytes of values in operands A and B. If an unsigned multiplication of the 8-bit values is desired, the ninth bits of values A0 and B0 for multiplication are zero. If a signed multiplication of the 8-bit values is desired, the 8-bit values are sign extended to nine bits. The resulting product from multiplier 202 is nominally an 18-bit value but actually only requires 16-bits to express.

Adder 204 is for rounding, multiply-and-accumulate operations on pixel values, and some filtering operations in pixel processing and search modes. Adder 204 adds a value from a register 203 and/or a value from shifter 208 to the product from multiplier 202. Register 203 stores a value that selects the rounding mode that applies if the sum from adder 204 is right shifted, for example, 0 or 1 for rounding down or up after a divide by two. Shifter 208 provides to adder 204 a value that is either zero or derived from the content of accumulator 206. For a simple multiplication, a multiplexer 207 provides a zero-valued data signal to shifter 208, and shifter 208 provides a zero-valued addend to adder 204. For a multiply-and-accumulate operation, multiplexer 207 selects the value from accumulator 206. Shifter 208 can either shift the accumulated value from accumulator 206 or leave the accumulated value unchanged. For normal multiply-and-accumulate operations, adder 204 receives and adds the unchanged accumulated value to the product from multiplier 202. For filter operations, shifter 208 shifts the accumulated value according to a desired weighting between the product and the accumulated value. The eight shifters 208 may additionally have alternate data paths (not shown) for performing parallel shift operations on eight pixel values.

A clamp circuit 205 selects eight output bits from the operation performed in slices 200 and handles overflow situations by clamping the sum from adder 204 as the operation requires. Clamp circuit 205 circuit writes either an 8-bit clamped value or a 16-bit (or larger) output value in accumulator 206. A result signal OUT8[0:7] from clamp circuit 205 of slice 200 represents a clamped product of two signed or unsigned values A0 and B0. The other seven multiplier slices similarly provide 8-bit portions of the 64-bit output signal OUT8.

In general processing mode, multiply unit 150 performs simultaneous multiplications of two pairs of 16-bit operands derived from the four 32-bit values in two 64-bit operands. Multiply unit 150 receives four positive 16-bit values in two operands A and B and for a signed multiplication, separately receives two sign bits from twos-complement units 144 and 145 for selecting the signs of resulting products. For signed multiplication, twos-complement units 144 and 145 determine the twos-compliments of any 16-bit negative values in the original operands and determines the sign bits accordingly. For unsigned multiplication, the 32-bit values are simply truncated to sixteen bits. Thus, operand selection circuit 140 passes unsigned 16-bit values to multiply unit 150 without change, but twos-complement blocks 144 and 145 invert any signed 16-bit values that are negative.

Multiply unit 150 performs 16×16-bit multiplications to generate two 32-bit output values. Specifically, slices 0 to 3 multiply a 16-bit value including bytes A0 and A1 of operand A by a 16-bit value including bytes B0 and B1 of operand B, and slices 4 to 7 multiply a 16-bit value including bytes A4 and A5 of operand A by a 16-bit value including bytes B4 and B5 of operand B. Multiply unit 150 ignores bytes A2, A3, A6, A7, B2, B3, B6, and B7 in general processing mode.

In FIG. 2, slices 200, 210, 220, and 230 operate cooperatively for multiplication of two 16-bit positive values. In particular, multipliers 202 in slices 200, 210, 220, and 230 respectively determine products A0*B0, A1*B0, A0*B1, and A1*B1. The products are 16-bit values which are portions of 32-bit values input to an adder 240. Product A0*B0 provides 16 bits aligned on the right with bit 0. Products A0*B1 and A1*B0 are aligned on the right with bit 8, and product A1*B1 is aligned on the right with bit 16. The sum from adder 240, which is a 32-bit value representing the product of positive 16-bit values, is held in a latch 242. For signed multiplications, a multiplexer 246 selects the positive product from latch 242 or a ones-complement value of the product according to a sign bit from operand selection circuit 140. An inverter 244 inverts each bit in the positive product to generate the ones-complement value. The sign bits for the products are passed to ALU 160 with signal OUT32. ALU 160 completes the multiplication by adding one to the result thereby completing a twos-complement for negative products. ALU 160 can simultaneously add a further value from accumulator 164 or operand selection circuit 140 for multiply-and-accumulate operations.

Figure 3:
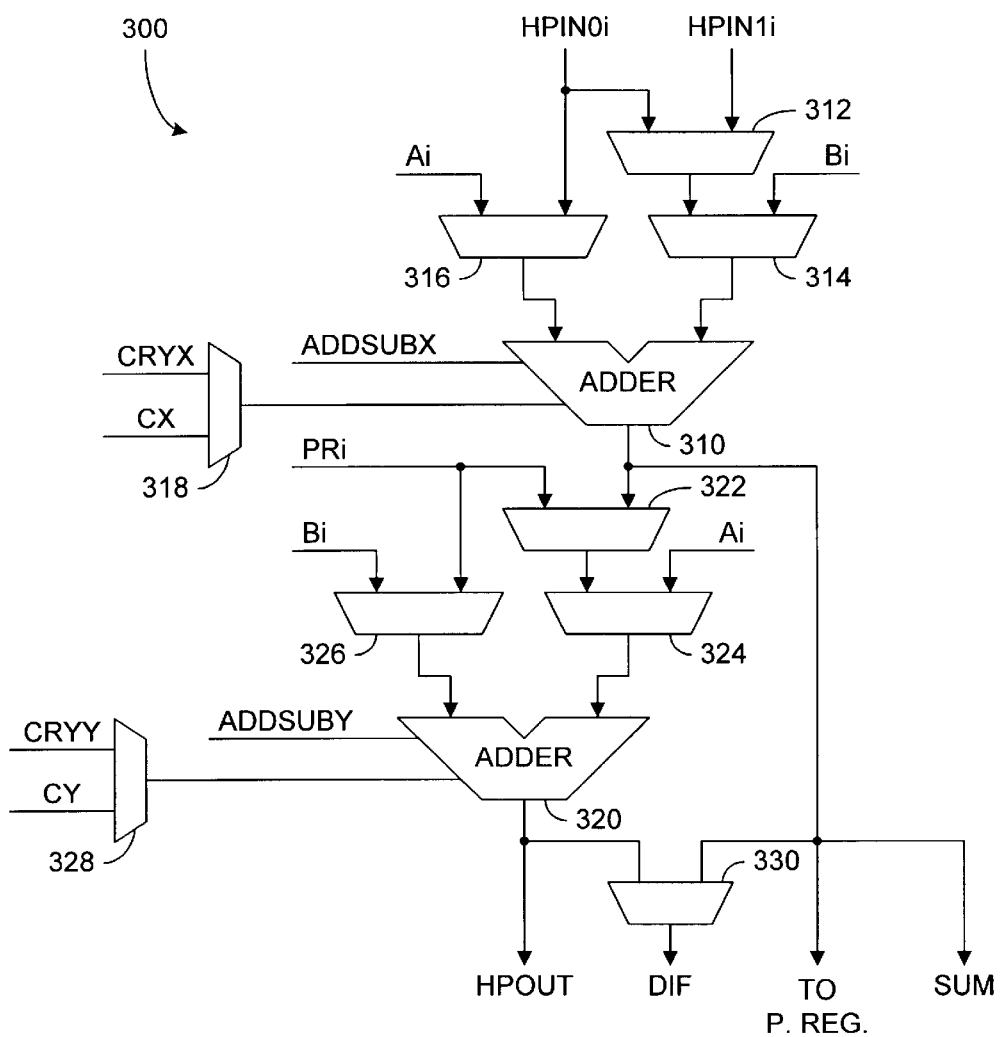
FIG. 3 is a block diagram of a portion of an arithmetic logic unit for the processor of FIG. 1.

ALU 160 contains two 32-bit shifters for general purpose mode shift operations and multiple slices operable in the different modes for parallel or cooperative processing. In the exemplary embodiment of the invention, ALU 160 includes eight slices, each slice including a pair of adder/subtractors. FIG. 3 shows an exemplary embodiment of an ALU slice 300, which is one of eight slices in ALU 160. Slice 300 includes adders 310 and 320. The term adder is used herein, but select signals ADDSUBX and ADDSUBY to adder 310 and 320 respectively determine whether each adder 310 or 320 determine the sum or the difference between the input operands. In the exemplary embodiment, adders 310 and 320 are 8-bit arithmetic units having 10-bit output signals and operate in parallel to selectably either add or subtract input values. Additionally, adders 310 and 320 are fast enough that if an output signal from adder 310 is an input signal to adder 320, adder 320 can generate a valid output within one clock cycle. For cooperative operation, adders 310 and 320 provide output carry signals for other slices, and multiplexers 318 and 328 selects carry bits for rounding or from an adjacent slice of slice 300 for additions or subtractions of 32-bit operands. Multiplexers 318 and 328 select carry bits that adders 310 and 320 use for rounding when sum is shifted for determining averages in pixel processing and search modes.

Signal ADDSUBX selects whether adder 310 performs an addition or a subtraction of input operands that input multiplexers 312, 314, and 316 select for adder 310. Input operands for adder 310 include 8-bit values Ai, Bi, HPIN0i, and HPIN1i from operand selection circuit 140. Index i ranges from 0 to 7 and is different for each ALU slice. Values Ai and Bi are bytes number i from respective 64-bit operands X and Y. Values HPIN0i and HPIN1i are adjacent bytes of operand X except for index i equal to 0. In particular, bytes HPIN0i and HPIN1i are bytes X(i−1) and Xi for i equal 1 to 7. For index i equal to zero, HPIN1i is X0 and HPIN0i is the last byte from the previous operand X. The 8-bit operands Ai and Bi are typically pixel values when processor 100 operates in motion estimation or pixel processing mode are parts of 32-bit operands when processor 100 operates in general purpose mode. Values HPIN0i and HPIN1i are for half-pixel and filtering operations such as averaging two neighboring pixel values. A signal SUM from adder 310 indicates the sum or difference which can be output from ALU slice 300 for an add or subtract instruction.

Signal ADDSUBY determines whether adder 320 determines the sum or difference of the input operands that input multiplexers 322, 324, and 326 select. Input operands for adder 310 include values Ai and Bi from operand selection circuit 140, a value PRi from a register 162, and an output value from adder 310. Register 162 is a line buffer that stores previous results from adder 310 as described further below.

Figure 4:
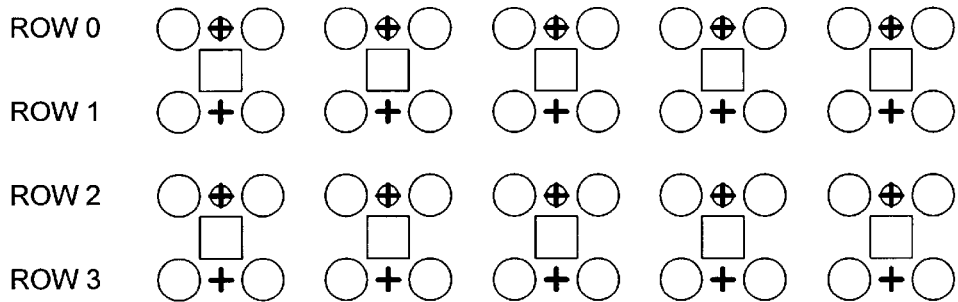
FIG. 4 illustrates an on-the-fly compression process in accordance with an aspect of the invention.

ALU slice 300 has an architecture that provides efficient implementation of several operations common to video processing. In particular, ALU slice 300 can efficiently perform an on-the-fly compression process illustrated in FIG. 4 or a half-pixel interpolation process illustrated in FIG. 5. In FIG. 4, the circles represent pixel values in an image array. For the compression process, pixel values from the array are input to processor 100 in type writer fashion starting with the left-most pixel values in row 0 of the array. During a single clock cycle, input operand X contains eight consecutive pixel values from a row, and each of four ALU slices (for index i equal to 1, 3, 5, and 7) processes two consecutive pixel values HPIN0 and HPIN1 from input operand X. In slice 300, multiplexers 312, 314, and 316 select values HPIN0i and HPIN1i as input values for adder 310. Signal ADDSUBX causes adder 310 to add the input values HPIN0i and HPIN1i with or without a carry to determine a sum which is output from adder 310. The carry is used or not depending on a desired rounding mode when the sum is used to determine an average. If only horizontal compression is desired, memory 120 or 130 receives an 8-bit average that is based on the sum (i.e., bits 1 to 8 from the sum).

A 4 to 1 compression requires further processing. For row 0 and every even row of the image array, the sum from adder 610, is stored in register 162 at the end of the clock cycle. (Alternatively, storing saves bits from the sum so that the sum is effectively right shifted one bit to save an average.) The storage location used in register 162 corresponds to position of pixel values HPIN0i and HPIN1i in their line of the image array. As described below, a special register controls the length of a line stored register 162. FIG. 4 illustrates the sums from adders 310 that are stored in register 162 as circled crosses. Register 162 effectively acts as a line buffer that stores a line of sums or horizontal averages of pixel values. The line in register 162 is about half the length of the original image array because register 162 holds one value for every two input values from a row of the image array. However, the values in register 162 can be kept as 10-bit values to prevent sums from overflowing the available storage.

For row 1 and every odd row of the image array, adder 310 again provides the sum of values HPIN0i and HPIN1i, but the sums, which FIG. 4 illustrates as crosses, are not stored in register 162. Instead, multiplexers 322 and 324 select the sum (or a shifted sum) from adder 310 as an addend for adder 320. Value PRi is from the location in register 162 corresponding to HPIN0i and HPIN1i and is equal to the sum (or average) determined for pixel values in the previous row. Multiplexer 326 selects value PRi as the other addend for adder 320. A carry into adder 320 is optional depending on the rounding mode. Thus, adder 320 adds the sum that adder 310 generates for the odd row to a sum that adder 310 generated for the previous even row, and the sum from adder 320 is equal to the sum of four pixel values. FIG. 4 illustrates the sums from adder 320 as squares. Selecting bits 2 through 10 of the sum from adder 320 or right shifting the sum from adder 320 by two bits provides an average of the four pixel values. Output signal HPOUT from slice 300 represents the average pixel value and can be combined with averages from other slices to generate a 32-bit signal containing four averages. The averages can be written to buffer 120 or register file 130 for an initial portion of a hierarchical search.

For just vertical compression, multiplexers 312, 314, and 316 in all slices select HPIN0i as both addends of adder 310. For even rows, the average values stored to register 162 are equal to HPIN0i. The line stored to register 162 is twice as long since there is no horizontal compression. For odd rows, multiplexers 312, 314, and 316 select value HPIN0i for both addends of adder 310, and multiplexers 322, 324, and 326 select the sum from adder 310 and value PRi as the addends for adder 320. The result from adder 320 is stored to memory 120 or 130.

Figure 5:
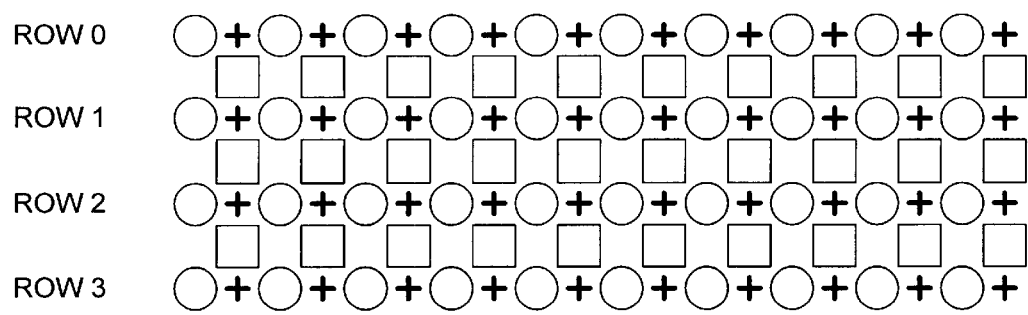
FIG. 5 illustrates a half-pixel interpolation process in accordance with an aspect of the invention.

Half-pixel interpolation processes are similar to the compression processes but generate an array that is the approximately the same size as an input array. FIG. 5 illustrates a half-pixel interpolation that might apply when a motion vector has half-integer horizontal and vertical components. In FIG. 5, circles represent the positions of pixel values in the input array. For the half-pixel interpolation of FIG. 5, multiplexers 312, 314, and 316 select signals HPIN0i and HPIN1i as addends for adder 310. The sum or average from adder 310, represented by crosses in FIG. 5, are simultaneously written to register 162 and provided to adder 320. Multiplexers 322, 324, and 326 select the output from adder 310 and value PRi as the addends for adder 320. Results from adder 320 for row 0 are discarded, but after row 0, the results from adders 320, represented by squares in FIG. 5, provide a half-pixel interpolation the original array. During a cycle of this half-pixel interpolation process, processor 100 can generate eight interpolated pixel values from input operand X and previous values from register 162. During a following cycle, operand X contains the next eight pixel values from the array undergoing half-pixel interpolation.

The results from adder 310 provides the half-pixel interpolated pixel values if only horizontal interpolation is desired. If signal Ai is both addends for adder 310 in the above process, adder 320 provides results for vertical-only half-pixel interpolation.

Although the above compression and interpolation processes were described in regard to video data arrays from data bus 110, the processes can also be applied to data in processor 100. In particular, data in memory 120 or 130 can be transferred through ALU 160, compressed or interpolated, and stored into either memory 120 or 130.

Multiply unit 150 and ALU 160 can conduct vertical filtering of an image array in a manner similar to half-pixel interpolation process. For example, for a vertical FIR filter, multiply unit 150 simultaneously multiplies eight pixel values from a row of an image array by a filter coefficient for the row, and ALU 160 adds the resulting products to previously calculated values in register 162. Multiply unit 150 and ALU 160 can similarly use register 162 in two-dimensional filtering of image arrays.

ALU slice 300 also efficiently determines of an absolute difference between pixel values. For determination of the absolute difference, multiplexers 312, 314, and 316 select values Ai and Bi as the input values for adder 310, and multiplexers 322, 324, and 326 select values Bi and Ai as the input values for adder 320. Signal ADDSUBX causes adder 310 to subtract Bi from Ai, and signal ADDSUBX causes adder 320 to subtract Ai from Bi. In parallel, adders 310 and 320 determine and provide differences Ai-Bi and Bi-Ai to input ports of a multiplexer 330 which has a select signal that is a carry bit from adder 310 or 320. As a result, multiplexer 330 select the difference Ai-Bi or Bi-Ai that is positive, and outputs signal DIF. Determining the absolute difference is commonly used in motion searches to quantify the difference between a reference block of pixel values and a candidate block of pixel values from a search window. In motion estimation mode, buffer 120 provides an operand (e.g., operand X) containing eight pixel values from a candidate block in a search window, and register file 130 provides an operand (e.g., operand Y) containing eight pixel values from a reference block. In one clock cycle, ALU 160 determines eight absolute differences. An adder 172 (FIG. 1) adds the eight absolute differences to an accumulated difference stored one of registers 170.

Registers 170 include general purpose registers for temporary storage of data and special purpose registers which control the operation of processor 100. Operand select circuit 140 accesses registers 170 for source operands, and results from results bus 186 can be written to registers 170 via multiplexer 174 or accumulated in registers 170 via multiplexer 174 and adder 172. Additionally, processor 100 has an I/O bus 178 that permits an external circuit such as a host processor to read or write values in registers 170. Access to registers 170 gives a host processor the ability to control processor 100 by writing control parameters to and reading results from registers 170.

In the exemplary embodiment of the invention, registers 170 include sixteen 16-bit general purpose registers GR0 to GR15 and sixteen 16-bit special purpose registers SR16 to SR31. Table 1 lists the special purpose registers currently defined for the exemplary embodiment of the invention.

TABLE 1

Special Registers

| Register | Description |
| --- | --- |
| SR16 | Search Window Write Address |
| SR17 | Search Window Read Address |
| SR18 | Register File Write Address |
| SR19 | Register File Read Address |
| SR20 | Address Increment |
| SR21 | Mode |
| SR22 | Total Absolute Difference (TADD0) |
| SR23 | Total Absolute Difference (TADD1) |
| SR24 | Do Loop Counter |
| SR25 | Loop Counter |
| SR26 | Search Window Base |
| SR27 | Register File Base |
| SR28 | Target Address for Jump or Branch Operation |
| SR29 | Modulo |

An address generator uses registers SR16 to SR 20 when generating addresses for transfers of data between external memory and buffer 120 or register file 130 and between buffer 120 and register file 130. Further, some instructions use the addresses determined from registers SR16 to SR20 when accessing operands in buffer 120 or register file 130. In particular, register SR16 indicates a destination address in buffer 120 when the data is directed to buffer 120, and register SR18 indicates a destination address in register file 130 when the data is directed to register file 130. When sequentially transferring data out of buffer 120 or register file 130, registers SR17 or SR19 indicate the respective addresses from which data is read. Register SR20 indicates an address increment (or equivalently the number of pixel values) between one read or write operation and the next. Typically, the address increment in register SR20 indicates the offset between the start of one row to the start of the next row in an array of pixel values being transferred.

Register SR21 (MODE) indicates the operating mode of processor 100. In particular, one of three bits "m", "p", and "g" being set indicates processor 100 is currently in motion estimation mode, pixel processing mode, or general processing mode. A bit "a" selects whether results from adder 172 are written to special registers SR22 (TADD0) or SR23 (TADD1). Registers SR22 (TADD0) and SR23 (TADD1) are for accumulations of total differences between blocks. In particular, an instruction "mc", which is described below, causes tree adder 172 to sum the absolute differences of eight pairs of pixel values and add that total to an accumulated value in register TADD0 or TADD1. Two bits "tt" in mode register SR21 indicate a scale for transfers between memories 120 and 130. The exemplary embodiment supports three scales, transfer with no change in scale (tt=00), transfers where 8-bit values in buffer 120 correspond to 16-bit values in register file 130 (tt=01), and transfers where 8-bit values in buffer 120correspond to 32-bit values in register file 130 (tt=10). Scale circuits 134 and 136 implement the required movement and extension of values being transferred. Bit "s" indicates whether compression is on or off for incoming data, and two bits "x" and "y" control whether processor 100 respectively performs horizontal and vertical half-pixel interpolation or compression.

Registers SR24 and SR25 are for implementing programming loops. Register SR24 contains a count for repetitive execution of an instruction having a doloop flag set, and register SR25 contains a count indicating the number of times a loop from a "wait" instruction to a branch target instruction needs to be executed. Register SR28 holds an address of the branch target instruction and is used with the "wait" instruction and branch instructions such as brch, bge, and blt described below.

Registers SR26 and SR27 contain offsets which are added to the addresses for accessing buffer 120and register file 130, respectively. In particular, immediately before accessing a location in memory 120 or 130 the offset from register SR26 or SR27 is added to the address previously derived from the register number or from read and write addresses in registers SR16 to SR19.

Register SR29 provides a modulo value which indicates the desired length of the line buffer in register 162. Associated with register 162 is a counter that identifies the next location to be accessed in register 162. Normally, 64-bit locations are sequentially accessed in order until reaching the end of a line. Register SR29 indicates the count at the end of the line or row in an array of pixels, and the counter resets to zero upon reaching value in register SR29. Also, an instruction {go} resets the counters that contain the indexes for acessing register 162.

Control unit 190 of processor 100 includes an I/O state machine 192, a sequencer 194, a program counter 196, and a microcode memory 198. I/O state machine 192 is a command based state machine that determines the operating state of processor 100. An external device, such as a host processor, can enter I/O commands via CPU bus 178 into a command queue (not shown) of I/O state machine 192. Table 2 contains a list of I/O commands for an exemplary embodiment of I/O state machine 192.

TABLE 2

I/O Commands

| Command | Bit Assignment | Description |
|---|---|---|
| reset | 0000 xxxx xxxx | software reset |
| set operating mode | 0010 lmpg hhcc | operating mode<br>l: low 16-bit is input of mpy<br>m: motion search mode<br>p: pixel processing mode<br>g: generic processing mode |

TABLE 2-continued

I/O Commands

| Command | Bit Assignment | Description |
|---|---|---|
| set r/w mode | 0011 xxxs xtvr | xy: half-pixel operating<br>cc: carry in<br>read/write mode<br>s: sign extension mode of shift<br>t: [O] TADD0, [1] TADD1<br>v: read through half-pixel ALU<br>r: register file read |
| write memory | 010x aaaa aaaa | write memory starting at aa. . .aa |
| read memory | 011x aaaa aaaa | read memory stating at aa. . .aa |
| execute μ-code | 1aaa aaaa aaaa | execute starting at aa. . .aa |

Processor 100 has two operating states referred to herein as I/O mode and sequencer mode. I/O mode is for information transfers between processor 100 and an external device such as an external memory or a local bus of a host computer. Sequencer mode is for execution of programs stored in microcode memory 198.

To illustrate operation of processor 100and I/O state machine 192, a hierarchical search for a motion vector is described. The hierarchical search includes two steps. The first step compresses a search window using the horizontal lo and vertical compression process and determines an approximate motion vector using compressed pixel information. The second step finds the actual motion vector using uncompressed pixel information and a smaller search window centered on an area that the approximate motion vector identifies. To use processor 100 to perform the first step of the hierarchical search, I/O state machine 192 performs a set r/w mode command to set half-pixel operating for horizontal and vertical compression and a set operating mode command to select motion search mode for processor 100. I/O state machine 192 then executes a write memory command to control writing of a reference block from data bus 110 to register file 130. For the write, pixel values from data bus 110 pass through ALU 160 which performs the compression process described above to generate compressed pixel data that are written in register file 130. Another write memory command transfers pixel values of the search window from data bus 110 through the compression process of ALU 160 to buffer 120. The compressed pixel data in register file 130 and buffer 120 permit the search window to be larger than buffer 130 could otherwise accommodate. Additionally, compression reduces the number of comparisons of pixel blocks and the total processing time for the search.

I/O state machine 192 then performs an execute μ-code command which starts execution of a routine for the first step in the hierarchical search process. Sequencer 194 controls execution of such routines as described below. The first step compares the reference block to each block of equal size in buffer 120. The architecture of processor 100 facilitates efficient comparisons of the reference block with blocks in the search window. In particular, in a single instruction, operand selection circuit 140 selects an operand A that is eight pixel values from register file 130 (i.e., from the reference block) and an operand B that is eight pixel values from buffer 120 (i.e., from the search window). In each ALU slice 300 of ALU 160, adder 310 subtracts a pixel value B from pixel value A, and adder 320 subtracts pixel value A from pixel value B. Multiplexer 330 selects either the difference from adder 310 or 320 according a generated carry bit. Accordingly, eight positive differences are simultaneously determined in a single clock cycle. Tree adder 172 accumulates the positive differences with a total absolute difference in special register TADD0 or TADD1. An exhaustive search process compares the reference block to every possible block in the search window (buffer 120) to identify a block that has the least absolute difference from the reference block.

For the second step of the hierarchical search, the pixel values are not compressed via ALU 160 but are loaded directly into buffer 120 and register file 130. Accordingly, upon completion of the routine for the first step of the hierarchical search, I/O state machine 192 performs a set r/w mode command to stop the compression of incoming data, performs write memory commands to load pixel values in buffer 120 and register file , and performs an execute μ-code command to start a routine that implements the second step of the hierarchical search. The search window for the second step of the hierarchical search can cover less area than the full search window because the first step of the search narrowed the search. The result of the second step is a motion vector for the reference block.

Processor 100 executes user programs or routines from microcode memory 198. The user programs can perform functions such as general system control procedures, diversified video, audio, and modem data processing, discrete cosine transformations (DCTs), and fast Fourier transforms (FFTs). Memory 198 includes ROM for routines for common video processing operations such as the hierarchical search and RAM for customized user programs. Sequencer 194 controls execution of a user program that is stored in microcode memory 198.

In the exemplary embodiment of the invention, each instruction in the user program is a 32-bit code having one of the formats shown in Table 3.

TABLE 3

Microcode Field Definitions

```
Regular          33222222222211111111111
instructions     10987654321098765432109876543210
                 #sssmMMMMiccaaaaagbbbbbgdddddgrw
                        II       IIIIII
movl             33222222222211111111111
                 10987654321098765432109876543210
                 IsssmMMMMiIIIIIIIIIIIIIIIddddddIrw
mac/mpy (p = 1)  33222222222211111111111
                 10987654321098765432109876543210
                 #sssmSS • IiIIIIIIIIIbbbbbxdddddxrw
mac/mpy (p = 0)  33222222222211111111111
                 10987654321098765432109876543210
                 #sssmSSSSiccaaaaagbbbbbgdddddgrw
```

In Table 3, "#" indicates is a doloop flag, "s" indicates sequencing code bit, "m" is set to indicate an instruction is a multiply (mpy) or multiply-and-accumulate (mac) instruction, "M" is an opcode bit, "i" and "I" are bits of immediate values, "." is an unused bit, "a" and "b" are bits of register numbers for source operands, "d" is a bit of a register number for a destination operand, g designates whether an associated register number is a special/general register, "r" and "w" respectively designate a read and/or a write from buffer 120, "S" is a bit of a shift value for a mac or mpy instruction, "c" is a condition code bit, and "x" is a code bit for a mpy or mac instruction.

Sequencer 194 uses a three bit sequencing code "sss" to determine the value PC of program counter 194 for the next instruction executed. Table 4 shows the sequencing codes for the exemplary embodiment.

TABLE 4

Sequencing Codes

| Symbol | Binary Code | Description |
|---|---|---|
| jnu | 000 | Jump to address 0. (PC = 0) |
| nxt | 001 | Next instruction (PC = PC + 1) |
| brch | 010 | Jump to target branch address in target register SR28 (PC = SR28) |
| jsr | 011 | Jump to address in target register and save next program count to four-deep stack in processor 100. (PC = SR28, push PC + 1) |
| rts | 111 | Return from subroutines pops address from stack into program counter. |
| wait | 100 | Jump to target branch address (PC = SR28) if the loop counter SR25 is not zero, else continue (PC = PC + 1). Decrement loop counter. |
| bge | 101 | Jump to target branch address (PC = SR28) if condition code cc indicates greater or equal, else continue (PC = PC + 1). |
| blt | 110 | Jump to target branch address (PC = SR28) if condition code cc indicates less than, else continue (PC = PC + 1). |

In assembler syntax, instructions jnu, brch, jsr, rts, wait, bge, and blt are incorporated as the sequencing code "sss" of a preceding data path instruction.

Tables 5 and 6 describe the operation codes for data path instructions in the exemplary embodiment of processor 100. Table 5 gives the operation code "MMMM" that applies to most instructions.

TABLE 5

Opcode Definitions

| Instruction | Code | Description |
|---|---|---|
| nop | 0000 | no operation |
| abs | 0001 | Stores the absolute value of operand A to operand D |
| add | 0010 | Stores the sum of operands A and B to operand D |
| sub | 0011 | Stores the difference of operands A and B to operand D |
| cmp | 0100 | Unsigned compare to set sequencer condition codes |
| scmp | 0101 | Signed compare to set data path condition codes |
| ucmp | 0110 | Unsigned compare to set data path condition codes |
| {go} | 0111 | Reset address counters |
| mc | 1000 | Store the sum of 8 absolute differences and the previously accumulated absolute difference to register TADD0 or TADD1 |
| mcclr | 1001 | Store the sum of 8 absolute differences to register TADD0 or TADD1 |
| mov | 1010 | Move data |
| movl | 1011 | Move long data |
| swap | 1100 | Swap A and B |
| shf | 1101 | Shift operation |
| norm | 1110 | Normalize |
| s2s | 1111 | Copy to new location in buffer 120 |

Most of the instructions will be recognized from the description in Table 5 and the above description of processor 100. Instruction norm shifts the most significant non-zero bit to the left most position and indicates the number of shifts required. Instruction s2s is a memory to memory move instruction where 64-bits are read from memory 120 or 130 and written back to memory 120 or 130. Instruction s2s moves data through ALU 160 so that the data can be compressed or interpolated when instruction s2s transfers data from one location to another within processor 100.

If bit 27 "m" is set in an instruction, the instruction is a multiply (mpy) or a multiply-and-accumulate (mac) instruction. Table 6 indicates the encoding of operation code bits "x" for mpy and mac instructions.

TABLE 6

Multiply Instruction Encoding

| Instruction | Code | Description |
|---|---|---|
| mpy | 00 | multiply |
| mac | 01 | multiply-and-accumulate |
| mpy, ac | 10 | multiply with write to accumulator |
| mac, ac | 11 | multiply-and-accumulate with write to accumulator |

Each instruction except instruction movl has a doloop flag "#". When the doloop flag in an instruction is set, sequencer 192 repeats execution of the instruction unless the doloop count in register SR24 is zero. Sequencer 192 decrements the doloop count in register SR24 for each repetition of executing the instruction.

The read and write bits "r" and "w" if set cause transfers between buffer 120 and register file 130. Special registers SR16 to SR19 indicate the read and write addresses in buffer 120 and register file 130 for such transfers, and register SR20 indicates the amount read and write addresses are incremented after the access. In accordance with and aspect of the invention, transfers between memories 120 and 130 are independent of execution of data path instructions. In particular, register file 130 has five ports that are sufficient to simultaneously read two operands for a data path instruction, read a value to be transferred to buffer 120, write a result from a data path instruction, and write a value transferred from buffer 120. Buffer 120 is only able to provide a source operand or record a result from data path instructions in search mode. Accordingly, in pixel processing and general processing modes, buffer 120 can simultaneously accommodate a read and a write. Accordingly, in pixel processing and general processing modes, the contents of register file 130 can be easily and nearly transparently swapped to and from buffer 120. This effectively provides a large register file for processor 100 without increasing the size of the register numbers required in the instructions.

Although the invention has been described with reference to particular embodiments, the description is only an example of the invention's application and should not be taken as a limitation. Various adaptations and combinations of features of the embodiments disclosed are within the scope of the invention as defined by the following claims.

I claim:

1. An integrated processor comprising:
    a processing circuit, wherein the processing circuit comprises:
        a first adder having input ports coupled to receive operands that are neighboring pixel values in an image array;
        a line buffer having an input port coupled to the adder;
        a second adder having a first input port coupled to the first adder and a second input port coupled to the line buffer; and
        a results bus coupled to write results from the second adder to either of the first memory and the second memory;
    a first memory coupled the processing circuit; and
    a second memory coupled to the processing circuit, wherein:
    the processor is operable in a first mode in which the first memory stores pixel values of a search window and the second memory stores pixel values in a reference block for which a matching block in the search window is sought; and
    the processor is operable in a second mode in which the second memory operates as a register file having storage locations identified by register numbers in instructions that the processor executes.

2. The processor of claim 1, further comprising:
    an input port;
    an operand selection circuit operable to direct pixel data from the input port to the first adder; and
    an I/O state machine capable of controlling a write operation to either of the first memory and the second memory, wherein during the write operation, the processing circuit performs a compression operation on pixel data from the input port and compressed data from the processing circuitry is written to either the first or second memory.

3. The processor of claim 1, wherein the processing circuit further comprises:
    a first multiplexing circuit coupled to the input ports of the first adder, wherein input signals to the first multiplexing circuit include a first signal representing a portion of a first operand, a second signal representing a portion of a second operand, and signals representing consecutive portions of one of the first and second operands; and
    a second multiplexing circuit coupled to the input ports of the second adder, wherein input signals to the second multiplexing circuit include the first signal, the second signal, a signal representing a value from the line buffer, and a signal indicating results from the first adder.

4. The processor of claim 3, wherein:
    the processing circuit further comprises a multiplexer having input ports coupled to the first adder and the second adder; and
    a select signal for the multiplexer depends on a carry signal from one of the first adder and the second adder when the first adder determines a difference between the portion of the first operand and the portion of the second operand and the second adder determines a difference between the portion of the second operand and the portion of the first operand.

5. An arithmetic logic unit comprising:
    a line buffer; and
    a plurality of slices, each slice comprising:
        a first adder and a second adder, the first adder being coupled to an input port of the line buffer, each of the adders being operable in a first mode to determine the sum of values represented by signals at input ports of the adder and in a second mode to determine the difference between the values represented by the signals at the input ports of the adder;
        a first multiplexing circuit coupled to the input ports of the first adder, wherein input signals to the first multiplexing circuit include a first signal representing a portion of a first operand, a second signal representing a portion of a second operand, and signals representing consecutive portions of one of the first and second operands; and a second multiplexing circuit coupled to the input ports of the second adder, wherein input signals to the second multiplexing circuit include the first signal, the second signal, a signal representing a value from the line buffer, and a signal indicating results from the first adder.

6. The arithmetic logic unit of claim 5, wherein each slice further comprises a multiplexer having input ports coupled to the first adder and the second adder, wherein when the first adder determines a first difference between the portion of the first operand and the portion of the second operand and the second adder determines a second difference between the portion of the second operand and the portion of the first operand, the multiplexer selects an output signal representing whichever of the first and second differences is positive.

7. The arithmetic logic unit of claim 6, wherein the multiplexer has a select terminal coupled to a carry output from one of the first and second adders.

* * * * *